US007358939B2

(12) United States Patent
Kim et al.

(10) Patent No.: US 7,358,939 B2
(45) Date of Patent: Apr. 15, 2008

(54) REMOVING CROSSTALK IN AN ORGANIC LIGHT-EMITTING DIODE DISPLAY BY ADJUSTING DISPLAY SCAN PERIODS

(75) Inventors: Chang Oon Kim, Yongin-si (KR); Chan Young Jeong, Seongnam-si (KR); Young Seok Sohn, Yongin-si (KR); Jeong Hwan Lee, Daegu-si (KR)

(73) Assignee: Leadis Technology, Inc., Sunnyvale, CA (US)

( * ) Notice: Subject to any disclaimer, the term of this patent is extended or adjusted under 35 U.S.C. 154(b) by 692 days.

(21) Appl. No.: 10/902,226

(22) Filed: Jul. 28, 2004

(65) Prior Publication Data

US 2006/0022964 A1 Feb. 2, 2006

(51) Int. Cl.
*G09G 3/30* (2006.01)
*G06F 3/038* (2006.01)

(52) U.S. Cl. ............................ 345/77; 345/76; 345/82; 345/204; 345/690; 315/169.3

(58) Field of Classification Search .................. 345/76, 345/82, 204, 690; 315/169.3
See application file for complete search history.

(56) References Cited

U.S. PATENT DOCUMENTS

| | | | |
|---|---|---|---|
| 5,170,158 A | 12/1992 | Shinya | |
| 5,420,604 A | 5/1995 | Scheffer et al. | |
| 5,572,211 A | 11/1996 | Erhart et al. | |
| 5,684,502 A | 11/1997 | Fukui et al. | |
| 5,689,280 A | 11/1997 | Asari et al. | |
| 5,719,589 A * | 2/1998 | Norman et al. | 345/82 |
| 5,747,363 A | 5/1998 | Wei et al. | |
| 5,754,157 A | 5/1998 | Kuwata et al. | |
| 5,764,212 A | 6/1998 | Nishitani et al. | |
| 5,786,799 A | 7/1998 | Matsui et al. | |
| 5,818,409 A | 10/1998 | Furuhashi et al. | |
| 5,852,429 A | 12/1998 | Scheffer et al. | |
| 5,877,738 A | 3/1999 | Ito et al. | |
| 5,900,856 A | 5/1999 | Iino et al. | |
| 6,040,815 A | 3/2000 | Erhart et al. | |

(Continued)

FOREIGN PATENT DOCUMENTS

EP 0837446 A1 4/1998

(Continued)

OTHER PUBLICATIONS

International Search Report and Written Opinion; PCT/US2005/24639; Jul. 7, 2006.

*Primary Examiner*—My-Chau T. Tran
(74) *Attorney, Agent, or Firm*—Fenwick & West LLP

(57) ABSTRACT

An organic light-emitting diode display driver adjusts the display scan period of the current driving the organic light-emitting diodes of a selected row based upon the sum of the display data corresponding to the selected row, thereby removing crosstalk in the OLED display panel. The driver includes an adder for adding the display data corresponding to the selected row and a scan period look-up table storing display scan period values. The scan period look-up table is configured such that it outputs display scan period values substantially proportional or inversely proportional to the sum of the display data to remove bright crosstalk or dark crosstalk, respectively, in the OLED display panel.

27 Claims, 8 Drawing Sheets

U.S. PATENT DOCUMENTS

| | | | | |
|---|---|---|---|---|
| 6,097,352 | A | 8/2000 | Zavracky et al. | |
| 6,191,535 | B1 * | 2/2001 | Saitou | 315/169.3 |
| 6,252,572 | B1 | 6/2001 | Kurumisawa et al. | |
| 6,417,827 | B1 | 7/2002 | Nagao et al. | |
| 6,483,497 | B1 | 11/2002 | Iino et al. | |
| 6,522,317 | B1 | 2/2003 | Satou et al. | |
| 6,611,246 | B1 | 8/2003 | Ito et al. | |
| 6,803,729 | B2 * | 10/2004 | Muruyama | 345/82 |
| 6,825,820 | B2 | 11/2004 | Yamazaki et al. | |
| 6,870,323 | B1 | 3/2005 | Cok | |
| 6,943,761 | B2 * | 9/2005 | Everitt | 345/82 |
| 7,298,351 | B2 * | 11/2007 | Kim | 345/77 |
| 2001/0028346 | A1 | 10/2001 | Kudo et al. | |
| 2001/0038385 | A1 | 11/2001 | Negoi et al. | |
| 2001/0050662 | A1 | 12/2001 | Kota et al. | |
| 2002/0149608 | A1 | 10/2002 | Bu et al. | |
| 2002/0158585 | A1 | 10/2002 | Sundahl | |
| 2003/0011298 | A1 | 1/2003 | Palanisamy | |
| 2004/0201558 | A1 | 10/2004 | Arnold et al. | |
| 2005/0140612 | A1 | 6/2005 | Baek | |

FOREIGN PATENT DOCUMENTS

| | | |
|---|---|---|
| JP | 2000-172236 A | 6/2000 |
| JP | 2000-258751 A | 9/2000 |

* cited by examiner

REMOVING CROSSTALK IN AN ORGANIC LIGHT-EMITTING DIODE DISPLAY BY ADJUSTING DISPLAY SCAN PERIODS

TECHNICAL FIELD

The present invention relates to an organic light-emitting diode (OLED) display panel and, more specifically, to driving the OLED display panel without generating crosstalk.

BACKGROUND OF THE INVENTION

An OLED display panel is generally comprised of an array of organic light emitting diodes (OLEDs) that have carbon-based films or other organic material films between two charged electrodes, generally a metallic cathode and a transparent anode typically being glass. Generally, the organic material films are comprised of a hole-injection layer, a hole-transport layer, an emissive layer and an electron-transport layer. When voltage is applied to the OLED cell, the injected positive and negative charges recombine in the emissive layer and create electro-luminescent light. Unlike liquid crystal displays (LCDs) that require backlighting, OLED displays are self-emissive devices—they emit light rather than modulate transmitted or reflected light. Accordingly, OLEDs are brighter, thinner, faster and lighter than LCDs, and use less power, offer higher contrast and are cheaper to manufacture.

An OLED display panel is driven by a driver including a row driver and a column driver. A row driver typically selects a row of OLEDs in the display panel, and the column driver provides driving current to one or more of the OLEDs in the selected row to light the selected OLEDs according to the display data.

Conventional OLED display panels have the shortcoming that crosstalk is generated in the OLED display panel. The problem of crosstalk in conventional OLED display panels will be explained in more detail below with reference to FIG. 1.

FIG. 1 illustrates a conventional OLED display panel driven by a conventional driver. The OLED display panel 100 comprises an array of OLEDs 102 coupled between the rows (ROW(n−1), ROW(n), ROW(n+1), ROW (n+2) . . . ) and columns (C(n−1), C(n), C(n+1), C(n+2), . . . ) of the OLED display panel 100. The anodes of the OLEDs 102 are coupled to the columns and the cathodes of the OLEDs 102 are coupled to the rows of the display panel 100. Each OLED 102 has parasitic capacitance 103 associated with it. The parasitic capacitance 103 becomes larger when the associated OLED 102 is not lit, while the parasitic capacitance 103 becomes lower when the associated OLED 102 is lit and current flows through the OLED 102. The OLED display panel 100 is driven by a driver including a row driver 120 and a column driver 140.

The row driver 120 includes row driver control circuitry (not shown) configured to couple the cathodes of the OLEDs associated with a row ( . . . ROW(n−1), ROW(n), ROW(n+1), ROW(n+2) . . . ) of the display panel 100 to either a low voltage (e.g., GND) via resistors ( . . . RL(n−1), RL(n), RL(n+1), RL(n) . . . ) by closing the switches 126 and opening the switches 124 to select the row or to a high voltage (e.g., VCC) by closing the switches 124 and opening the switches 126 to unselect the row. For example, in FIG. 1, ROW(n) is shown selected with the switch 126 associated with ROW(n) being closed to couple ROW(n) to GND through the resistor RL(n) and the switch 124 associated with ROW(n) being open. The selection of ROW(n) by the row driver 120 forward-biases the OLEDs 102 coupled to ROW(n) to light the pixels of the OLED display panel 100 associated with the forward-biased OLEDs 102. Although one OLED 102 is shown for each pixel in FIG. 1, color OLED display panels may have three OLEDs 102 for each pixel, for R (Red), G (Green), and B (Black) and the amount of current through the three R, G, B OLEDs 102 may be separately controlled by separate column driver circuitry like the column driver 140 shown in FIG. 1

The column driver 140 includes current sources 142 that provide current ( . . . I(n−1), I(n), I(n+1), and I(n+2) . . . ) to the columns (C(n−1), C(n), C(n+1), C(n+2) . . . ) of the OLED display panel 100 to drive the OLEDs 102 on the columns. Once a row is selected by the row driver 120, the current sources 142 of the column driver 140 generate current ( . . . I(n−1), I(n), I(n+1), and I(n+2) . . . ) for the corresponding columns (C(n−1), C (n), C(n+1), C(n+2) . . . ) according to the corresponding display data ( . . . Idata(n−1), Idata(n), Idata(n+1), Idata(n+2) . . . ) to drives the OLEDs 102 on the selected row. The amount of current ( . . . I(n−1), I(n), I(n+1), and I(n+2) . . . ) is typically generated to be multiples of a unit driving current (e.g., Iw) and proportional to the display data ( . . . Idata(n−1), Idata(n), Idata(n+1), Idata(n+2) . . . ).

In one embodiment, the display data may be 1-bit data indicating 2 levels of brightness, for example, bright ("1") or dark ("0"), of the OLEDs 102. Thus, the current ( . . . I(n−1), I(n), I(n+1), I(n+2) . . . ) from the current sources 142 is generated to be, for example, 0 or Iw. In another embodiment, the display data may be 2-bit data indicating 4 levels of brightness, for example, very dark ("0"), dark ("1"), bright ("2), and very bright ("3"), of the OLEDs 102. Thus, the current ( . . . I(n−1), I(n), I(n+1), I(n+2) . . . ) from the current sources 142 is generated to be, for example, 0 or Iw, 2×Iw, or 3×Iw. The OLEDs 102 in the selected row (e.g., ROW(n)) are lit (Iw, 2×Iw, or 3×Iw) or unlit (zero current) based upon the current ( . . . I(n−1), I(n), I(n+1), and I(n+2) . . . ) corresponding to the columns (C(n−1), C(n), C(n+1), C(n+2) . . . ) of the panel 100.

FIG. 2 illustrates the column driving current waveform 202 for one of the columns of the OLED display panel 100 in a conventional OLED driver. As shown in FIG. 2, the column driving current 202 is high during the display scan period 204 with an amount of current proportional to the gray current level as indicated by the display data, and is low during the remaining period of a 1-line display period 206. Note that in a conventional OLED driver, the length of the display scan period 204 is identical for each row of the OLED display panel 100 regardless of the display data for the columns on each row.

Referring back to FIG. 1, there are two types of crosstalks that may be generated in an OLED display panel 100, so-called "bright crosstalk" and "dark" crosstalk." Bright crosstalk refers to the phenomenon that the lit OLEDs on rows with more black (unlit) pixels (OLEDs) tend to be lit brighter than the lit OLEDs on rows with less black (unlit) pixels (OLEDs). Dark crosstalk refers to the opposite of bright crosstalk, i.e., the phenomenon that the lit OLEDs on rows with more black (unlit) pixels (OLEDs) tend to be lit darker than the lit OLEDs on rows with less black (unlit) pixels (OLEDs).

Bright crosstalk is caused by the difference in the sink current of each row of the OLED display panel 100. As can be seen from FIG. 1, the sink current (Isink(n)) of a selected row (ROW(n)) is determined by the sum of the current ( . . . I(n−1), I(n), I(n+1), I(n+2) . . . ) driving the columns (C(n−1), C(n), C(n+1), C(n+2) . . . ) of the selected row (ROW(n)), which in turn is determined by the display data ( . . . Idata(n−1), Idata(n), Idata(n+1), Idata(n+2) . . . ). Therefore, the sink voltage Vsink(n) across the resistor RL(n) coupled to the selected row ROW(n) is also determined by the display data . . . Idata(n−1), Idata(n), Idata(n+1), Idata(n+2) . . . ), since Vsink(n)=Isink(n)×RL(n). This means that the sink voltages Vsink for the rows of the panel 100 are different from each other, since the column display data varies from row to row.

FIGS. 3A and 3B are diagrams illustrating the bright crosstalk phenomenon. As shown in FIGS. 3A and 3B, each of the columns is driven by a unit current source Iw. In the example of FIG. 3A, the display data is configured to make the region 302 of the panel 100 "black" while making the remaining areas 304, 306, 308, 310, 312, 324 "white." Assuming 2-bit display data (0 or 1), the current Iw will flow through the OLEDs coupled between rows ROW(n−1), ROW(n+1), ROW(n+2), ROW(n+3) and every column to light the OLEDs on these rows. In contrast, the current Iw will flow through the OLEDs coupled between row ROW(n) and the columns in regions 306, 308 to light the OLEDs but not between row ROW(n) and the columns in region 302. Therefore, the sink current Isink(n) for ROW(n) will be smaller than the sink current for other rows ROW(n−1), ROW(n+1), ROW(n+2), ROW(n+3), causing the sink voltage Vsink(n) for ROW(n) likewise smaller than the sink current for other rows ROW(n−1), ROW(n+1), ROW(n+2), ROW(n+3). As a result, the forward-bias voltage for the OLEDs on row ROW(n) is greater than the forward-bias voltages for the OLEDs on other rows ROW(n−1), ROW (n+1), ROW(n+2), ROW(n+3), causing the white regions 306, 308 to be brighter than the other white regions 304, 310, 312, 314., hence the term "bright crosstalk."

In the example of FIG. 3B, the display data is configured to make the regions 316, 318, 320, 322, 324 of the panel 100 "black" while making the remaining areas 326, 328, 330, 332, 334 "white." Because the area of the black regions 316, 318, 320, 322, 324 are different, the sink current Isink(n) will be the largest for row ROW(n+3) and the smallest for row ROW(n−1), gradually decreasing in the rows ROW(n+2), ROW(n+1), and ROW(n) in that order. As a result, the forward-bias voltage for the OLEDs on row ROW(n−1) is greatest and then gradually decreasing in rows ROW(n), ROW(n+1), ROW(n+2), and ROW(n+3) in that order causing the white regions 326, 328, 330, 332, 334 to become darker in that order in accordance with such forward-bias voltage. For example, regions 326, 328, 330, 332, 334 may display brightest white, bright white, white, dark white, darkest white, respectively, hence the term "bright crosstalk"

Referring back to FIG. 1, dark crosstalk is caused by the difference in the amount of parasitic capacitances 103 associated with the OLEDs 102 depending upon the display data for each row. The parasitic capacitance 103 associated with an OLED 102 is larger when the OLED 102 is not lit than when the OLED 102 is lit, because a conducting OLED 102 reduces the associated parasitic capacitance 103. Therefore, a row with more OLEDs unlit will have a larger sum of parasitic capacitance than a row with less OLEDs unlit. Because the row with larger parasitic capacitance has a larger time constant (R-C time constant) and it takes longer to drive the OLEDs 102 associated with such row with a larger time constant, the OLEDs 102 associated with such row with a larger time constant show a reduced brightness even when they are lit.

FIGS. 3C and 3D are diagrams illustrating the dark crosstalk phenomenon. As shown in FIGS. 3C and 3D, each of the columns is driven by a unit current source Iw. In the example of FIG. 3C, the display data is configured to make the region 350 of the panel 100 "black" while making the remaining areas 352, 354, 356, 358, 360, 362 "white." Assuming a 2-bit display data (0 or 1), the current Iw will flow through the OLEDs coupled between rows ROW(n−1), ROW(n+1), ROW(n+2), ROW(n+3) and every column to light the OLEDs on these rows. In contrast, the current Iw will flow through the OLEDs coupled between row ROW(n) and the columns in regions 354, 356 to light the OLEDs but not between row ROW(n) and the columns in region 350. Therefore, the total parasitic capacitance for row ROW(n) will be larger than the total parasitic capacitance of the rows ROW(n−1), ROW(n+1), ROW(n+2), ROW(n+3). Therefore, it will take longer to drive the OLEDs on row ROW(n) than it would take to drive the OLEDs on rows ROW(n−1), ROW(n+1), ROW(n+2), ROW(n+3), and thus the OLEDs in regions 354, 356 display a darker white than the other white regions 352, 358, 360, 362, hence the term "dark crosstalk."

In the example of FIG. 3D, the display data is configured to make the regions 374, 376, 378, 380, 382 of the panel 100 "white" while making the remaining areas 364, 366, 368, 370, 372 "black." Because the area of the black regions 364, 366, 368, 370, 372 are different, the parasitic capacitance associated with row ROW(n+3) will be the smallest and the largest for row ROW(n−1), gradually increasing in the rows ROW(n+2), ROW(n+1), and ROW(n) in that order. As a result, it will take the longest amount of time to drive row ROW(n−1) and the shortest amount of time to drive row ROW(n+3), the amount of time to drive gradually decreasing in rows ROW(n), ROW(n+1), ROW(n+2), and ROW (n+3) in that order, causing the white regions 374, 376, 378, 380, 382 to become darker in accordance with such parasitic capacitance and the associated amount of time taken to drive the row. For example, regions 382, 380, 378, 376, 374 may display brightest white, bright white, white, dark white, darkest white, respectively.

Either one of the bright crosstalk and the dark crosstalk may be corrected by appropriately adjusting the supply voltage VCC powering the column driver circuitry 140. For example, dark crosstalk tends to be more prevalent at lower gray scales, and thus a higher VCC may be used to more quickly charge the parasitic capacitance and thus alleviate the dark crosstalk. However, this will aggravate the bright crosstalk that manifests itself more evidently at high gray scales. In contrast, the bright crosstalk tends to be more prevalent at higher gray scales, and thus a lower VCC may be used to reduce the differences in sink current and sink voltage for each row and thus alleviate the bright crosstalk. However, this will aggravate the dark crosstalk that manifests itself more evidently at lower gray scales.

Therefore, there is a need for an OLED display panel driver that can correct bright crosstalk as well as dark crosstalk.

SUMMARY OF THE INVENTION

The present invention provides a driver for driving an OLED display panel including a plurality of organic light emitting diodes (OLEDS) arranged in rows and columns with capabilities to adjust the display scan period of the current driving the OLEDs to remove crosstalk in the OLED display panel. The driver is configured to select an active row and to adjust the display scan period of the current driving the OLEDs coupled between the columns and the active row based upon the sum of the display data corresponding to the active row. The driver includes an adder for adding the display data corresponding to the active row to generate the sum of the display data and a scan period look-up table storing display scan period values. The scan period look-up table receives the sum of the display data and outputs the display scan period value corresponding to the sum of the display data of the active row to the current source driving the OLEDS.

In one embodiment, the scan period look-up table is configured such that it outputs display scan period values substantially proportional to the sum of the display data to remove bright crosstalk in the OLED display panel. In another embodiment, the scan period look-up table is configured such that it outputs display scan period values substantially inversely proportional to the sum of the display data to remove dark crosstalk in the OLED display panel.

In still another embodiment, the scan period look-up table may further receive a reference current coefficient, a specific coefficient, and a delay coefficient corresponding to the OLED display panel. The scan period look-up table may receive the sum of the display data multiplied with the reference current coefficient and divided by the specific coefficient as its input, and output the display scan period control signal with the delay coefficient added or subtracted as its output to the current sources driving the. OLEDs.

The OLED driver of the present invention has the advantage that crosstalk between rows of the OLED panel are eliminated, because the display scan periods for the rows are adjusted differently based upon the sums of the display data corresponding to the rows. The scan periods may be adjusted to be substantially proportional to the sums of the display data to remove bright crosstalk, or substantially inversely proportional to the sums of the display data corresponding to the rows to remove dark crosstalk. Accordingly, the OLED display panels driven by the driver in accordance with the present invention does not show crosstalk.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

FIGS. 3C and 3B are diagrams illustrating the dark crosstalk phenomenon.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 4:
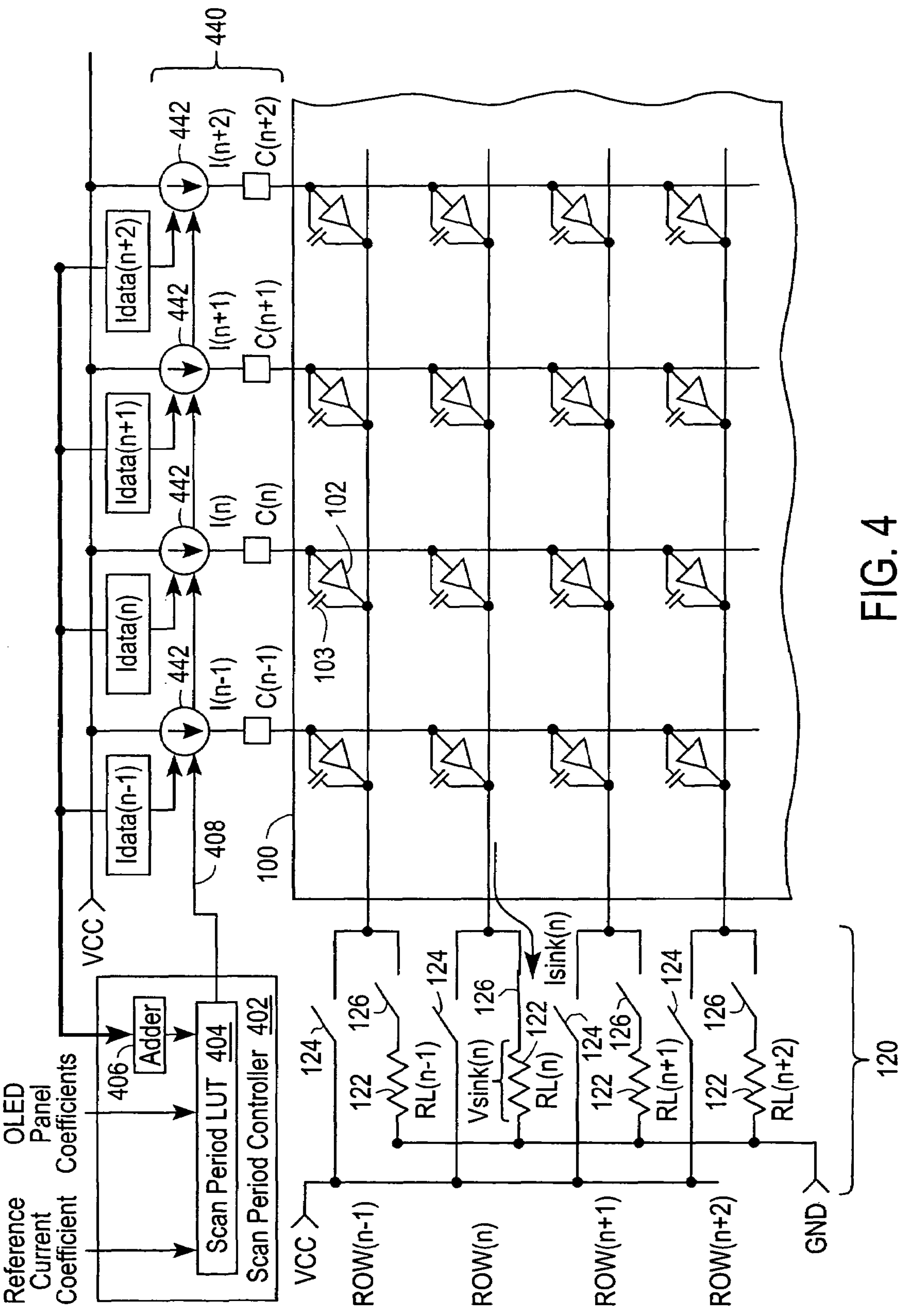
FIG. 4 illustrates an OLED display panel driven by a driver according to on embodiment of the present invention.

FIG. 4 illustrates an OLED display panel driven by a driver according to one embodiment of the present invention. The OLED display panel 100 comprises an array of OLEDs 102 coupled between the rows and columns of the panel 100. The anodes of the OLEDs 102 are coupled to the columns ( . . . C(n−1), C(n), C(n+1), C(n+2), . . . ) and the cathodes of the OLEDs 102 are coupled to the rows ( . . . ROW(n−1), ROW(n), ROW(n+1), and ROW(n+2) . . . ) of the display panel 100. The OLEDs 102 have parasitic capacitances 103 associated with the OLEDs 102. The OLED display panel 100 is driven by the driver including a row driver 120 and a column driver 440.

Figure 1:
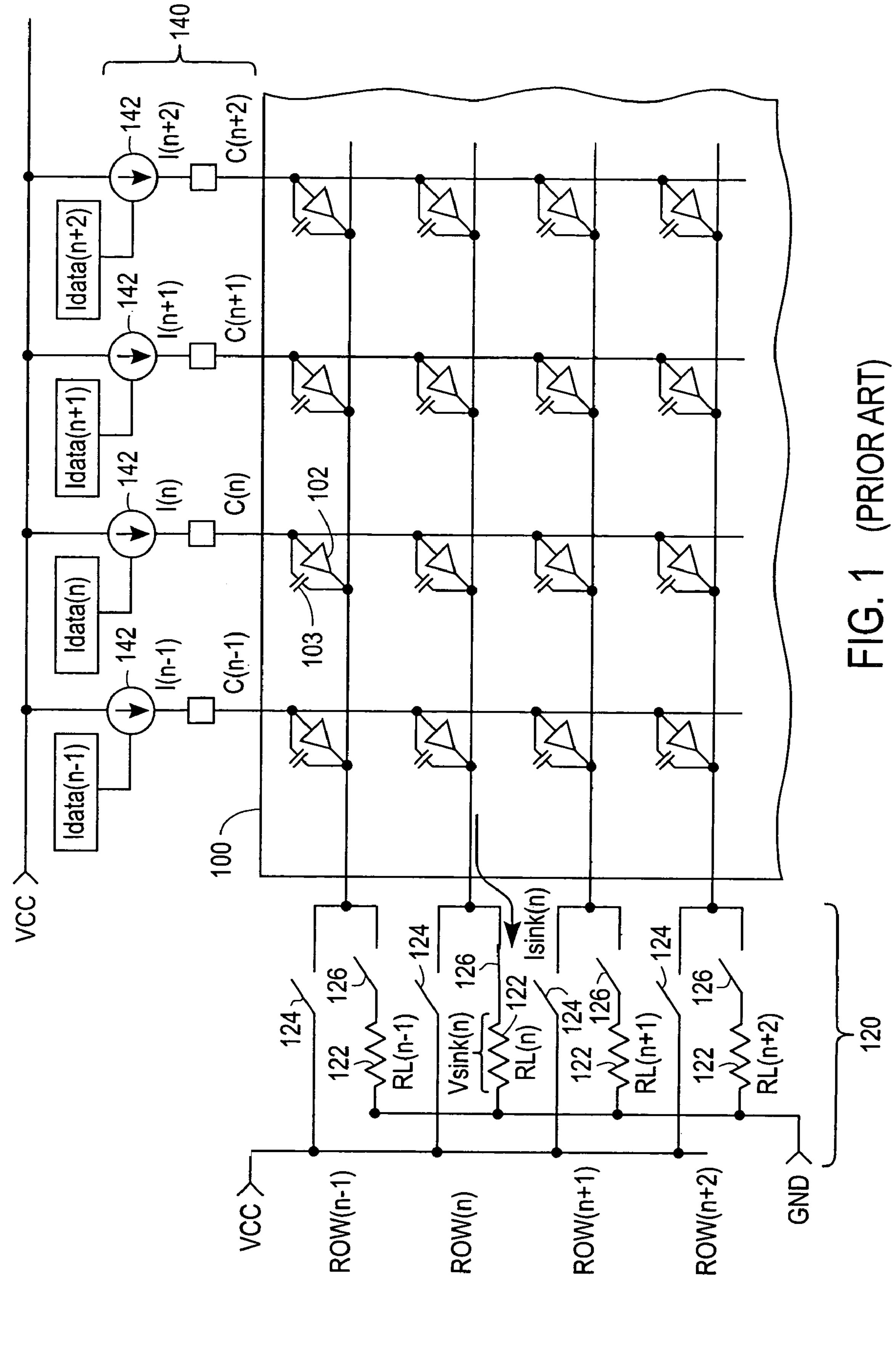
FIG. 1 (PRIOR ART)
FIG. 1 illustrates a conventional OLED display panel driven by a conventional driver.
Figure 2:
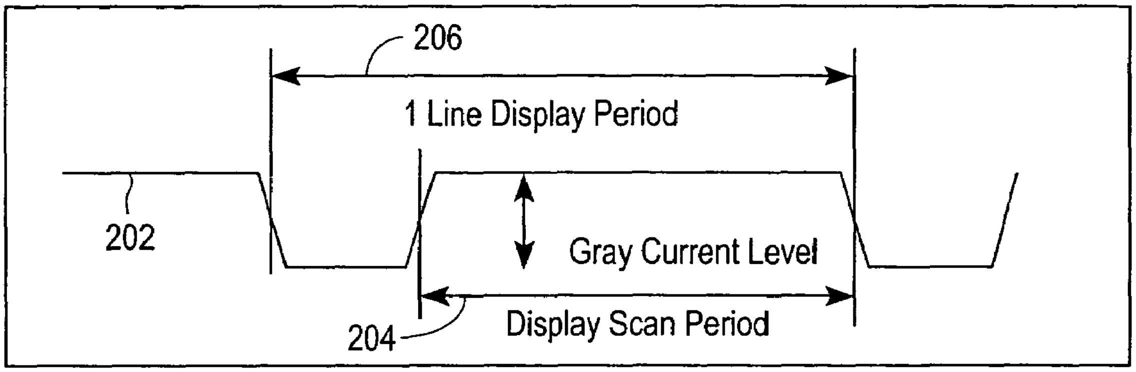
FIG. 2 (PRIOR ART)
FIG. 2 illustrates the column driving current waveform for one of the columns of the OLED display panel in a conventional OLED driver.

The row driver 120 includes row driver control circuitry (not shown) configured to couple the cathodes of the OLEDs 102 associated with a row ( . . . ROW(n−1), ROW(n), ROW(n+1), ROW(n+2) . . . ) of the display panel 100 to either a low voltage (e.g., GND) via resistors ( . . . RL(n−1), RL(n), RL(n+1), RL(n) . . . ) by closing the switches 126 and opening the switches 124 to select the row or to a high voltage (e.g., VCC) by closing the switches 124 and opening the switches 126 to unselect the row. For example, in FIG. 1, ROW(n) is shown selected with the switch 126 associated with ROW(n) being closed to couple ROW(n) to GND and switch 124 associated with ROW(n) being open. The selection of ROW(n) by the row driver 120 forward-biases the OLEDs 102 coupled to ROW(n) to light the pixel of the OLED display panel 100 associated with the forward-biased OLED 102. Although one OLED 102 is shown for each pixel in FIG. 4, color OLED display panels may have three OLEDs 102 for each pixel, for R (Red), G (Green), and B (Black), and the amount of current through the three R, G, B OLEDs 102 may be separately controlled by separate column driver circuitry like the column driver 140 shown in FIG. 1

The column driver 140 includes current sources 442 that provide current ( . . . I(n−1), I(n), I(n+1), and I(n+2) . . . ) to the columns (C(n−1), C(n), C(n+1), C(n+2) . . . ) of the panel 100 to drive the OLEDs 102 on the columns. Once a row is selected by the row driver 120, the current sources 442 of the column driver 440 generate current ( . . . I(n−1), I(n), I(n+1), and I(n+2) . . . ) for the corresponding columns (C(n−1), C(n), C(n+1), C(n+2) . . . ) according to the corresponding display data ( . . . Idata(n−1), Idata(n), Idata(n+1), Idata(n+2) . . . ) to drives the OLEDs 102 on the selected row. The amount of current ( . . . I(n−1), I(n), I(n+1), and I(n+2) . . . ) is typically generated to be multiples of a unit driving current (e.g., Iw) and proportional to the display data ( . . . Idata(n−1), Idata(n), Idata(n+1), Idata(n+2) . . . ).

In one embodiment, the display data may be 1-bit data indicating 2 levels of brightness, for example, bright ("1") or dark ("0"), of the OLEDs 102. Thus, the current ( . . . I(n−1), I(n), I(n+1), I(n+2) . . . ) from the current sources 442 is generated to be, for example, 0 or Iw. In another embodiment, the display data may be 2-bit data indicating 4 levels of brightness, for example, very dark ("0"), dark ("1"), bright ("2), and very bright ("3"), of the OLEDs 102. Thus, the current ( . . . I(n−1), I(n), I(n+1), I(n+2) . . . ) from the current sources 442 is generated to be, for example, 0 or Iw, 2×Iw, or 3×Iw. The OLEDs 102 in the selected row (e.g., ROW(n)) are lit (Iw, 2×Iw, or 3×Iw) or unlit (zero current) based upon the current ( . . . I(n−1), I(n), I(n+1), and I(n+2) . . . ) corresponding to the columns (C(n−1), C(n), C(n+1), C(n+2) . . . ) of the panel 100.

The column driver 440 according to one embodiment of the present invention also includes a scan period controller 402 that controls the display scan period in one display period of the column driving current 440 from the current sources 442. The scan period controller 402 includes an adder 406 and a scan period LUT (Look-Up Table) 404. The adder 406 adds up display data ( . . . Idata(n−1), Idata(n), Idata(n+1), Idata(n+2) . . . ) for the selected row (e.g., ROW(n)) for one of R, G, and B, to generate a sum of the display data, SumDisplayData. The scan period LUT 404 receives the sum of the display data SumDisplayData and outputs a scan period control signal 408 for the selected row. The scan period controller 402 outputs the scan period control signal 408 to the current sources 442. The current sources 442 drive the OLEDs of the selected row according to the display scan period indicated by the scan period control signal 408. Note that in other embodiments there may be three scan period controllers 402 for the display data corresponding to three colors R, G, B in a color OLED display panel.

The scan period LUT 404 may be a register storing the scan period values to be output as the scan period control signal 408. The output scan period control signal 408 may be substantially proportional or substantially inversely proportional to the sum of the display data, SumDisplayData, for the selected row. The scan period values in the scan period LUT 404 may be stored in the scan period LUT 404 register by programming of the scan period LUT 404 from an external source.

Figure 3A:
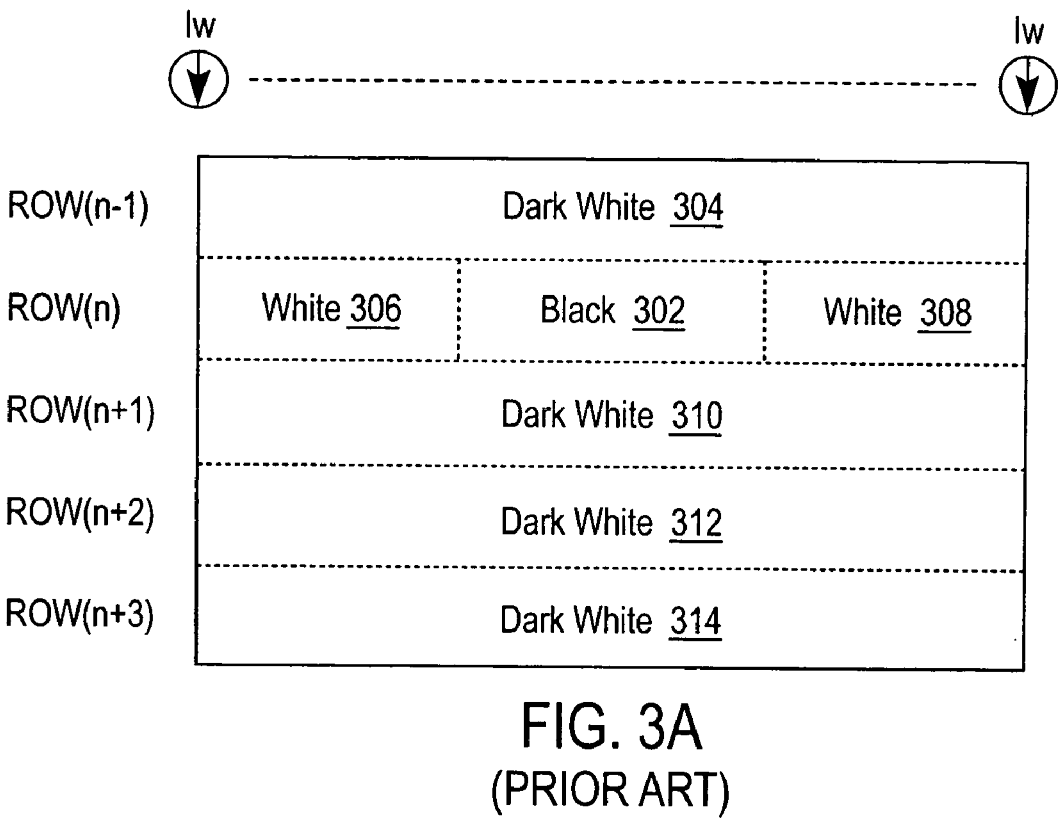
FIG. 3A (PRIOR ART)
FIGS. 3A and 3B are diagrams illustrating the bright crosstalk phenomenon.
Figure 6A:
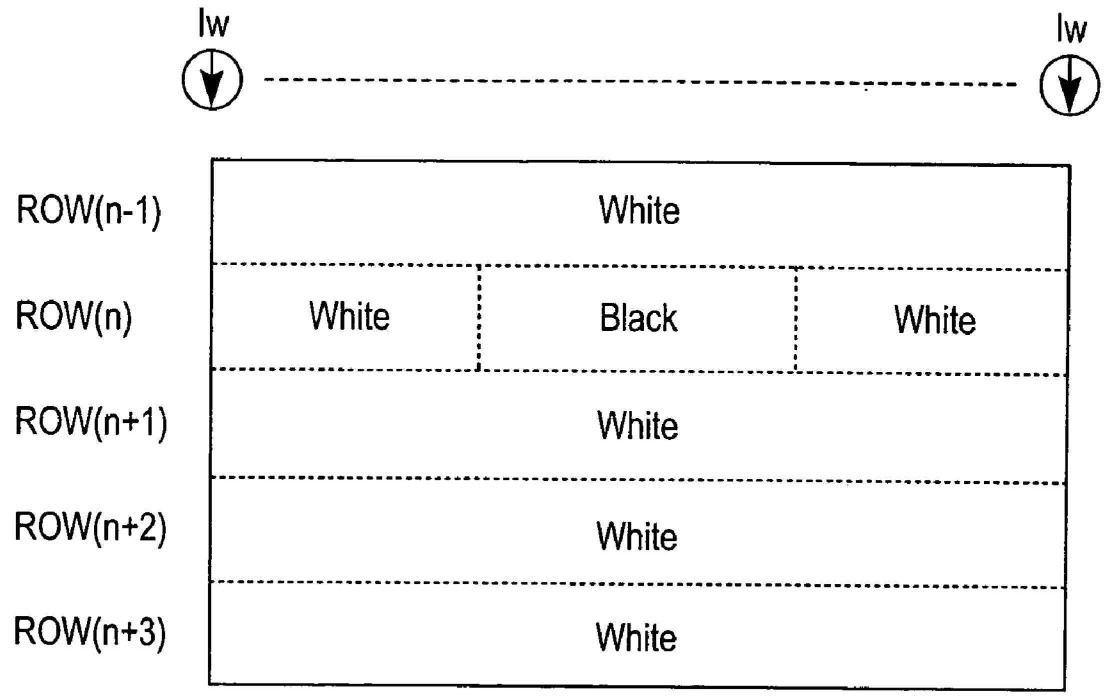
FIGS. 6A and 6B illustrate OLED panels driven by an OLED column driver according to one embodiment of the present invention.

In one embodiment, the scan period values are stored in the LUT 404 such that scan period values 408 that are substantially proportional to the sum of the display data for the selected row are output from the scan period LUT 404. For example, in the example shown in FIG. 3A, the sum of the display data for row ROW(n), SumDisplayData(n), is smaller than the sum of the display data for rows ROW(n−1), ROW(n+1), ROW(n+2), ROW(n+3), and ROW(n) shows "bright crosstalk" if the supply voltage VCC was adjusted to eliminate the other type of crosstalk, "dark crosstalk." In order to eliminate the bright crosstalk, the scan period LUT outputs scan period values 408 that are substantially proportional to the sum of the display data, SumDisplayData, for the rows. Therefore, the scan period value 408 for row ROW(n) becomes smaller than the scan period values 408 for rows ROW(n−1), ROW(n+1), ROW(n+2), ROW(n+3), and thus the white regions 306, 308 on row ROW(n) will show the same brightness as the other rows ROW(n−1), ROW(n+1), ROW(n+2), ROW(n+3), as shown in FIG. 6A, for example.

Figure 3B:
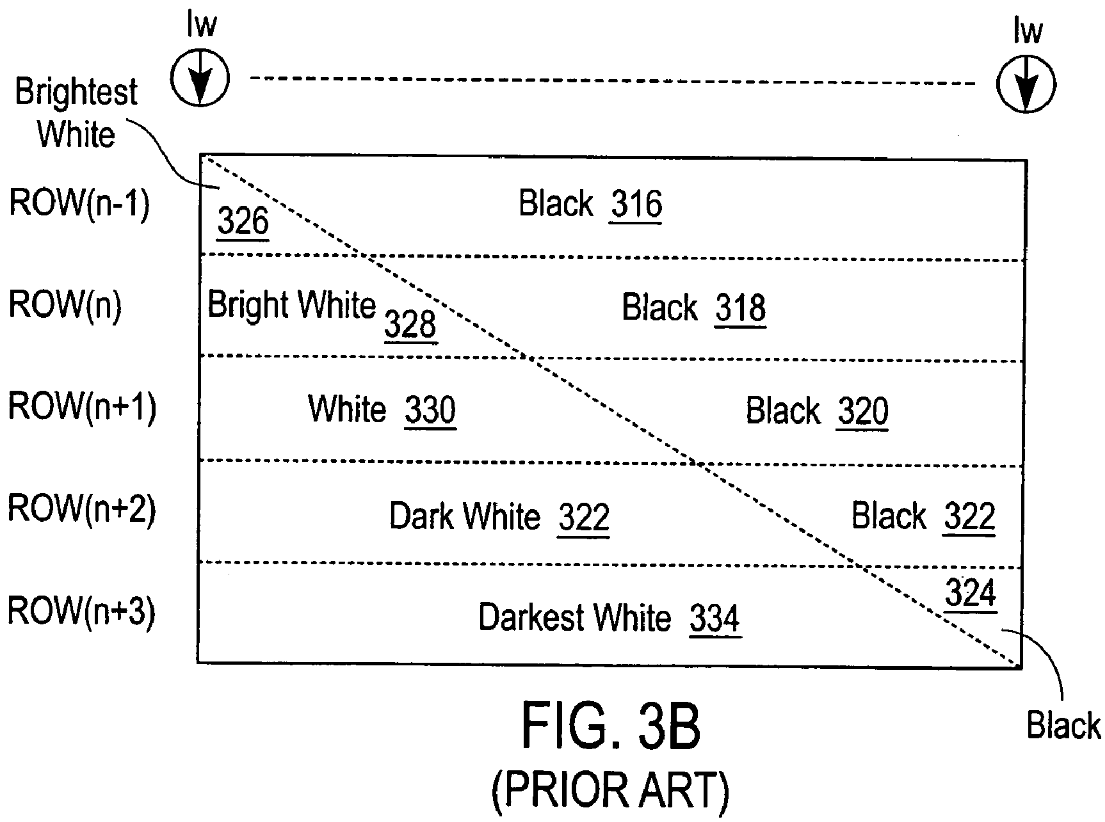
FIG. 3B (PRIOR ART)
Figure 6B:
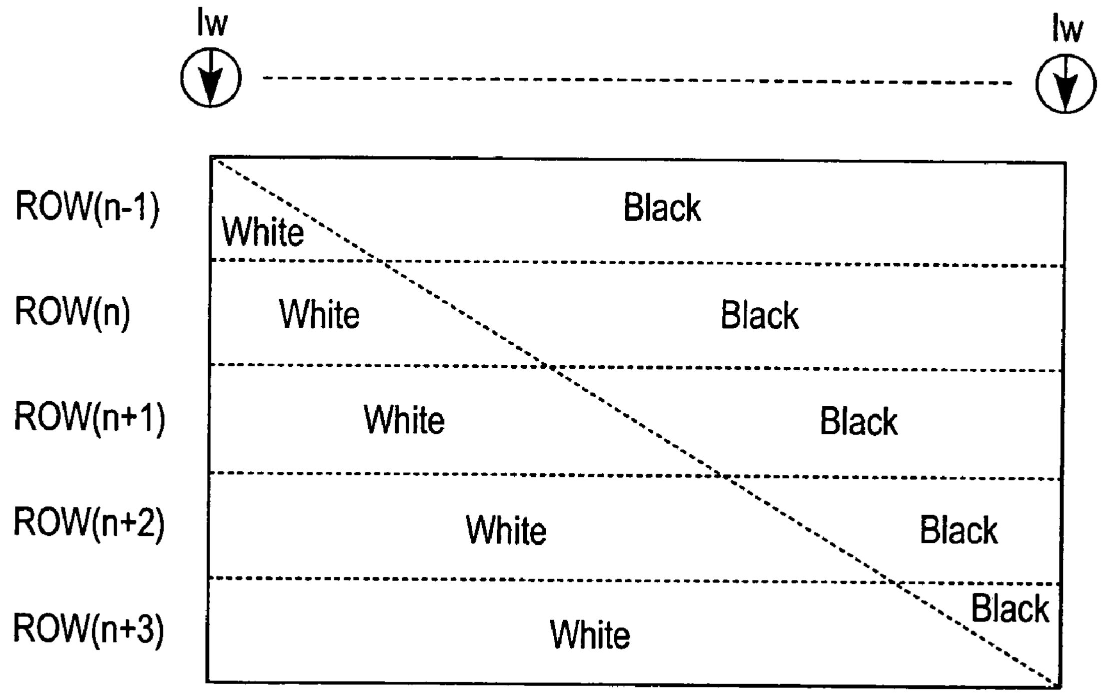

Similarly, in the example shown in FIG. 3B, the sum of the display data SumDisplayData becomes larger in rows ROW(n−1), ROW(n), ROW(n+1), ROW(n+2) in that order, and as such the rows show "bright crosstalk" in rows ROW(n−1), ROW(n) if the supply voltage VCC was adjusted to eliminate the other type of crosstalk, "dark crosstalk." In order to eliminate the bright crosstalk, the scan period LUT outputs scan period values 408 that are substantially proportional to the sum of the display data, SumDisplayData, for the rows. Therefore, the scan period values 408 becomes larger for the rows ROW(n−1), ROW(n), ROW(n+1), ROW(n+2), ROW(n+3) in that order, and thus the white regions 326, 328, 330, 332, 332 will show the same brightness as shown in FIG. 6B.

Figure 3C:
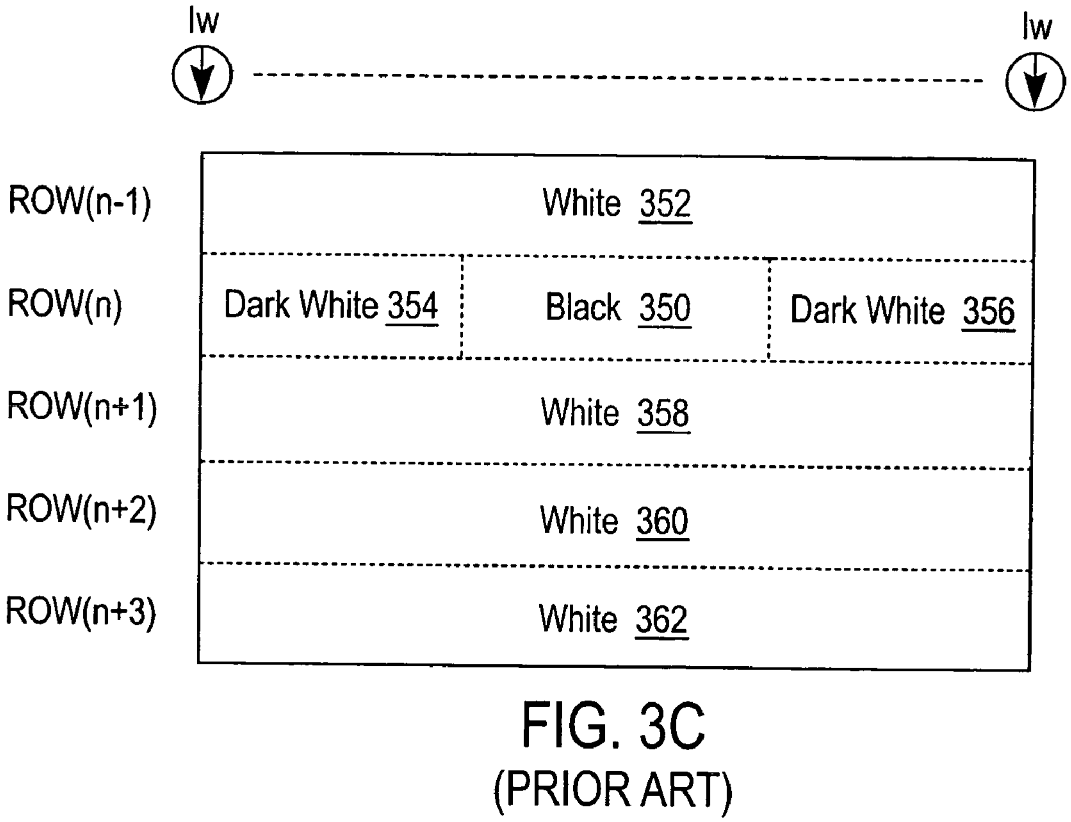
FIG. 3C (PRIOR ART)

In another embodiment, the scan period values are stored in the LUT 404 such that scan period values 408 that are substantially inversely proportional to the sum of the display data for the selected row are output from the scan period LUT 404. For example, in the example shown in FIG. 3C, the sum of the display data for row ROW(n), SumDisplayData(n), is smaller than the sum of the display data for rows ROW(n−1), ROW(n+1), ROW(n+2), ROW(n+3), and ROW(n) shows "dark crosstalk" due to the larger parasitic capacitance associated with row ROW(n) with the smaller display data, if the supply voltage VCC was adjusted to eliminate the other type of crosstalk, "bright crosstalk." In order to eliminate the dark crosstalk, the scan period LUT 404 outputs scan period values 408 that are substantially inversely proportional to the sum of the display data, SumDisplayData, for the rows. Therefore, the scan period value 408 for row ROW(n) becomes larger than the scan period values 408 for rows ROW(n−1), ROW(n+1), ROW(n+2), ROW(n+3), and thus the white regions 306, 308 on row ROW(n) will show the same brightness as the other rows ROW(n−1), ROW(n+1), ROW(n+2), ROW(n+3), as shown in FIG. 6A, for example.

Figure 3D:
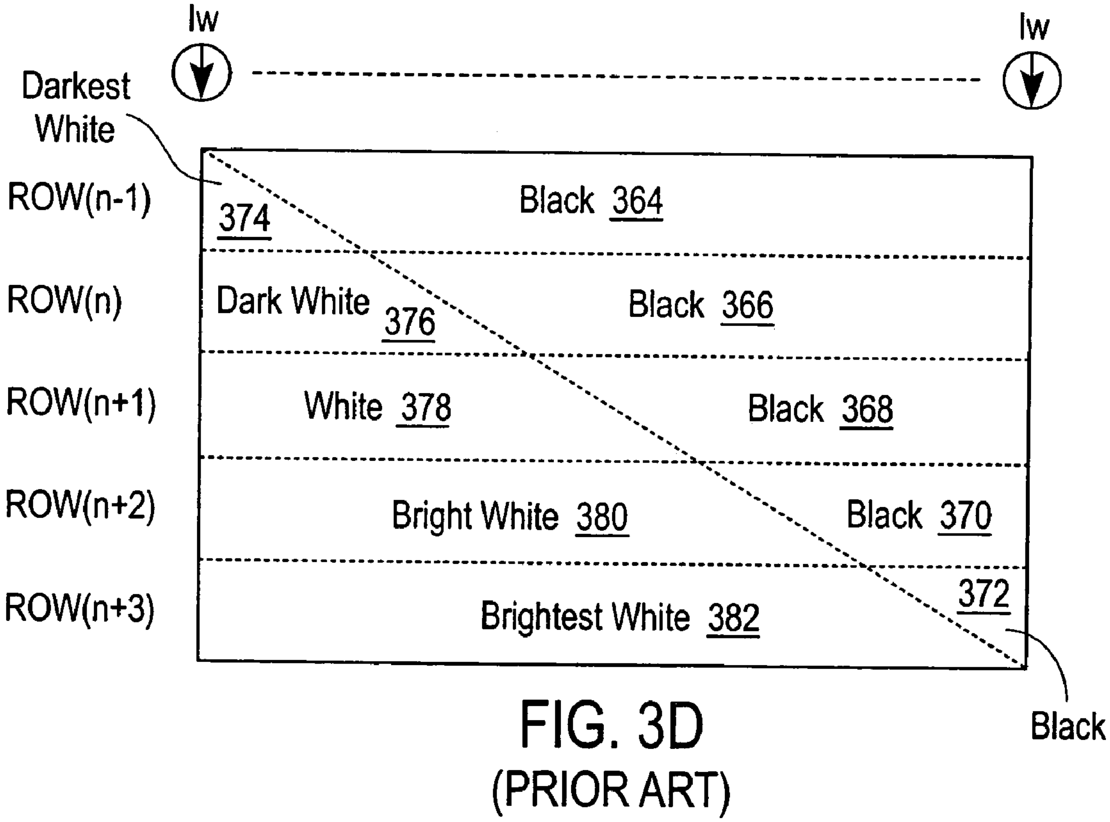
FIG. 3D (PRIOR ART)

Similarly, in the example shown in FIG. 3D, the sum of the display data SumDisplayData becomes larger in rows ROW(n−1), ROW(n), ROW(n+1), ROW(n+2) in that order, and as such the rows show "dark crosstalk" in rows ROW(n−1), ROW(n) due to the larger parasitic capacitances associated with the rows with smaller display data, if the supply voltage VCC was adjusted to eliminate the other type of crosstalk, "bright crosstalk." In order to eliminate the dark crosstalk, the scan period LUT 404 outputs scan period values 408 that are substantially inversely proportional to the sum of the display data, SumDisplayData, for the rows. Therefore, the scan period values 408 becomes smaller for the rows ROW(n−1), ROW(n), ROW(n+1), ROW(n+2), ROW(n+3) in that order, and thus the white regions 326, 328, 330, 332, 332 will show the same brightness as shown in FIG. 6B.

In still another embodiment of the present invention, the scan period LUT 404 may receive a reference current coefficient and OLED panel coefficients. The reference current coefficient is used to determine the reference brightness of a "white" display on the OLED display panel 100. The OLED panel coefficients are coefficients that may be used to compensate the differences in the display characteristics of OLED panels manufactured by different makers, and may include a "specific coefficient" and a "delay coefficient." The specific coefficient is used to compensate for the differences in the display characteristics of OLED panels manufactured by different makers by adjusting the sum of the display data input to the scan period LUT 404 as a multiplication or division factor. The delay coefficient is used to compensate the differences in the display characteristics of OLED panels manufactured by different makers by adding or subtracting a predetermined value to the display scan period 408 output by the scan period LUT 404. Thus, in one embodiment, the input to the scan period LUT 404 is SumDisplayData×Reference Current Coefficient/Specific Coefficient, and the delay coefficient is added to or subtracted from the output from the scan period LUT 404.

Figure 5:
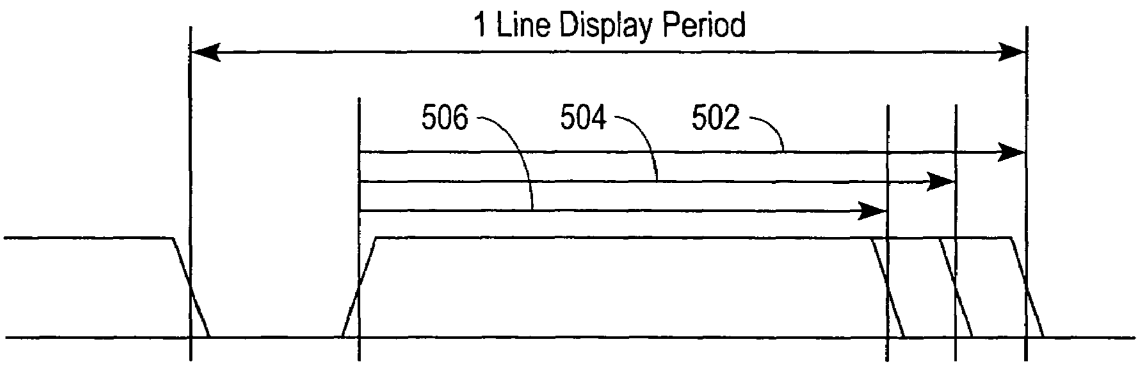
FIG. 5 illustrates the column driving current waveform for one of the columns of the OLED display panel in an OLED column driver according to one embodiment of the present invention.

FIG. 5 illustrates the column driving current waveform for one of the columns of the OLED display panel 100 in an OLED column driver 440 according to one embodiment of the present invention. As shown in FIG. 5, the display scan periods 502, 504, 506 are adjusted differently depending upon the sum of the display data for the selected row, as illustrated above with reference to FIG. 4.

FIGS. 6A and 6B illustrate OLED panels driven by an OLED column driver 440 according to one embodiment of the present invention. As shown in FIGS. 6A and 6B, the OLED panels do not show any crosstalk because the OLED column drivers 440 adjusted the drive scan periods for each row based upon the sum of the display data for each row.

Figure 7:
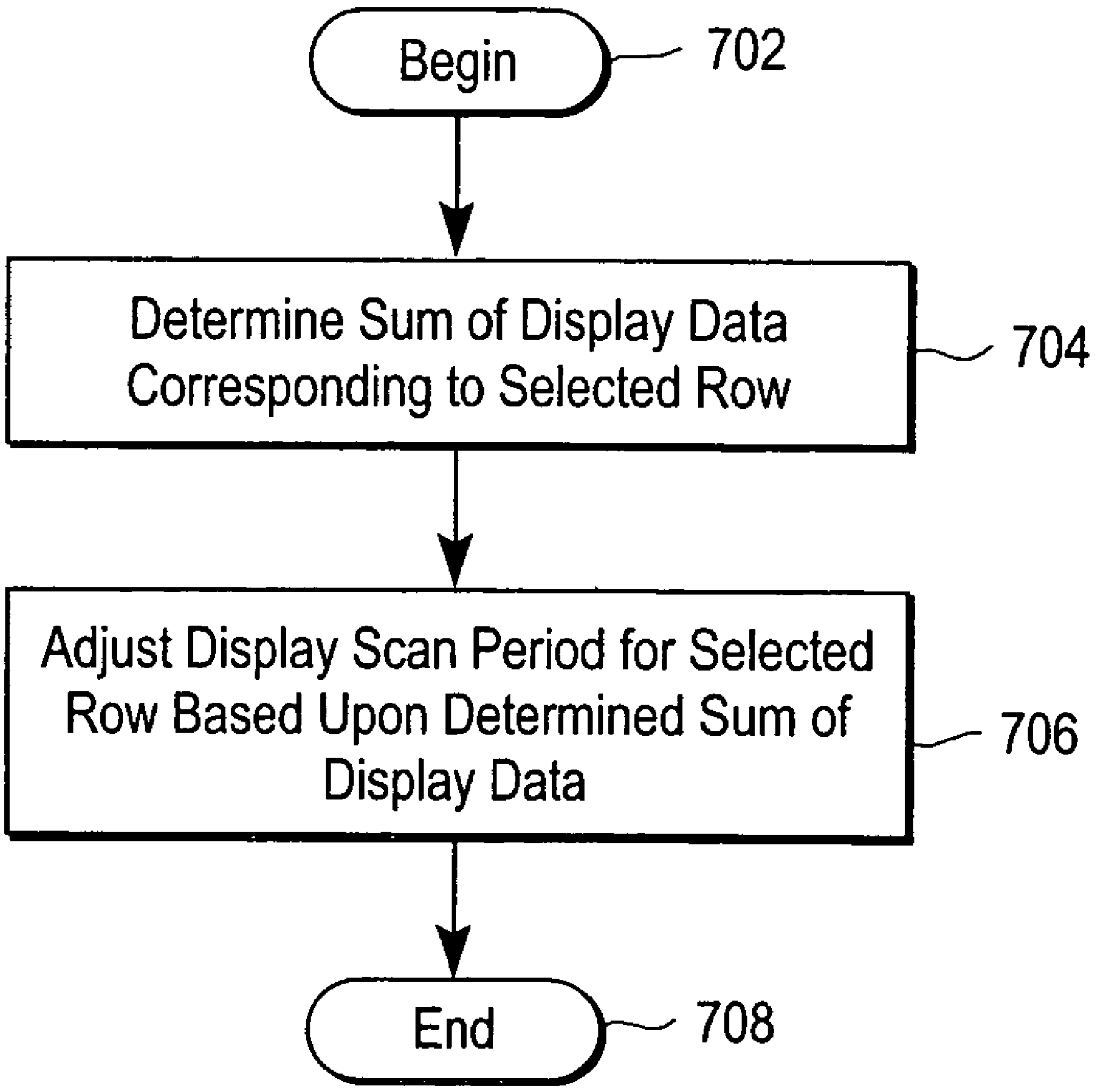
FIG. 7 is a flowchart illustrating a method of adjusting the display scan period of the rows of the OLED panel according to one embodiment of the present invention.

FIG. 7 is a flowchart illustrating a method of adjusting the display scan period of the rows of the OLED panel according to one embodiment of the present invention. As the process begins 702, the driver for the OLED display panel determines 704 the sum of the display data (SumDisplayData) for the selected row. Then, the driver adjusts 706 the display scan period for the selected row based upon the determined sum of the display data. If the OLED display panel is a color OLED display, the scan periods may be adjusted 706 separately for each of the colors R, G, B, based upon the sums of the display data for the selected row for each of the R, G, B colors. Then, the process ends 708.

The present invention has the advantage that crosstalk between rows of the OLED panel are eliminated, because the display scan periods for the rows are adjusted differently based upon the sums of the display data for the rows. The display scan periods may be adjusted to be substantially proportional to the sums of the display data corresponding to the rows to remove bright crosstalk, or substantially inversely proportional to the sums of the display data corresponding to the rows to remove dark crosstalk. Accordingly, the OLED display panels driven by the driver in accordance with the present invention does not show crosstalk.

Although the present invention has been described above with respect to several embodiments, various modifications can be made within the scope of the present invention. The present invention is not limited to any particular format or number of bits for representing the sum of the display data. Nor is the present invention limited to any particular number of bits used for the display data (e.g., 1 bit or 2 bit display data). Accordingly, the disclosure of the present invention is intended to be illustrative, but not limiting, of the scope of the invention, which is set forth in the following claims.

What is claimed is:

1. A driver for driving an organic light-emitting diode (OLED) display panel including a plurality of organic light-emitting diodes (OLEDs) arranged in rows and columns, the driver configured to select one of the rows and to provide current driving the OLEDs coupled between the columns and said selected one of the rows in accordance with display data corresponding to said selected one of the rows, the driver comprising:

a plurality of current sources providing the current driving the OLEDs coupled between the columns and said selected one of the rows; and a scan period controller coupled to the current sources, the scan period controller including an adder coupled to the display data corresponding to said selected one of the rows and adding the display data to generate a sum of the display data, the scan period controller adjusting a display scan period of the current provided from the current sources to the OLEDs on said selected row based upon the sum of the display data corresponding to said selected one of the rows, and the scan period controller controlling the current sources to provide the current driving the OLEDs between the columns and said selected one of the rows during the adjusted scan period.

2. The driver of claim 1, wherein the scan period controller adjusts the display scan period to be substantially proportional to the sum of the display data corresponding to said selected one of the rows.

3. The driver of claim 1, wherein the scan period controller adjusts the display scan period to be substantially inversely proportional to the sum of the display data corresponding to said selected one of the rows.

4. The driver of claim 1, wherein the scan period controller further includes:

a scan period look-up table coupled to the adder for receiving the sum of the display data and outputting a display scan period control signal to the current sources in response to the sum of the display data.

5. The driver of claim 4, wherein the scan period look-up table is a register storing display scan period values and configured to output the display scan period values substantially proportional to the sum of the display data.

6. The driver of claim 4, wherein the scan period look-up table is a register storing display scan period values and configured to output the display scan period values substantially inversely proportional to the sum of the display data.

7. The driver of claim 4, wherein the scan period look-up table further receives a reference current coefficient corresponding to the OLED display panel, the scan period look-up table outputting the display scan period control signal to the current sources in response to a product of the sum of the display data and the reference current coefficient.

8. The driver of claim 4, wherein the scan period look-up table further receives a specific coefficient corresponding to the OLED display panel, the scan period look-up table outputting the display scan period control signal to the current sources in response to a product of the sum of the display data and the specific coefficient.

9. The driver of claim 4, wherein the scan period look-up table further receives a delay coefficient corresponding to the OLED display panel, the scan period look-up table outputting a sum of the display scan period control signal and the delay coefficient to the current sources in response to the sum of the display data.

10. The driver of claim 1, wherein the display data are n-bit data indicating $2^n$ levels of brightness, n being a positive integer.

11. In a driver for driving an organic light-emitting diode (OLED) display panel including a plurality of organic light emitting diodes (OLEDs) arranged in rows and columns, the driver configured to select one of the rows and to provide current driving the OLEDs coupled between the columns and said selected one of the rows in accordance with display data corresponding to said selected one of the rows, a method comprising:

adding the display data corresponding to said selected one of the rows to determine a sum of the display data corresponding to said selected one of the rows; and adjusting a display scan period of the current driving the OLEDs on said selected one of the rows based upon the sum of the display data to provide the current driving the OLEDs between the columns and said selected one of the rows during the adjusted scan period.

12. The method of claim 11, wherein adjusting a display scan period comprises adjusting the display scan period to be substantially proportional to the sum of the display data.

13. The method of claim 11, wherein adjusting a display scan period comprises adjusting the display scan period to be substantially inversely proportional to the sum of the display data.

14. The method of claim 11, wherein adjusting a display scan period comprises:

receiving a reference current coefficient corresponding to the OLED display panel; and determining the display scan period based upon a product of the sum of the display data and the reference current coefficient.

15. The method of claim 11, wherein adjusting a display scan period comprises:

receiving a specific coefficient corresponding to the OLED display panel; and determining the display scan period based upon a product of the sum of the display data and the specific coefficient.

16. The method of claim 11, wherein adjusting a display scan period comprises:

receiving a delay coefficient corresponding to the OLED display panel;

determining the display scan period based upon the sum of the display data; and adding the delay coefficient to the determined display scan period.

17. The method of claim 11, wherein the display data are n-bit data indicating $2^n$ levels of brightness, n being a positive integer.

18. An organic light-emitting diode (OLED) display device comprising:

an OLED display panel including a plurality of organic light emitting diodes (OLEDs) arranged in rows and columns; and a driver configured to select one of the rows and to provide current driving the OLEDs coupled between the columns and said selected one of the rows in accordance with display data corresponding to said selected one of the rows, the driver comprising:

a plurality of current sources providing the current driving the OLEDs coupled between the columns and said selected one of the rows; and a scan period controller coupled to the current sources, the scan period controller including an adder coupled to the display data corresponding to said selected one of the rows and adding the display data to generate a sum of the display data, the scan period controller adjusting a display scan period of the current provided from the current sources to the OLEDs on said selected row based upon the sum of the display data corresponding to said selected one of the rows, and the scan period controller controlling the current sources to provide the current driving the OLEDs between the columns and said selected one of the rows during the adjusted scan period.

19. The organic light-emitting diode (OLED) display device of claim 18, wherein the scan period controller adjusts the display scan period to be substantially proportional to the sum of the display data corresponding to said selected one of the rows.

20. The organic light-emitting diode (OLED) display device of claim 18, wherein the scan period controller adjusts the display scan period to be substantially inversely proportional to the sum of the display data corresponding to said selected one of the rows.

21. The organic light-emitting diode (OLED) display device of claim 18, wherein the scan period controller further includes:

a scan period look-up table coupled to the adder for receiving the sum of the display data and outputting a display scan period control signal to the current sources in response to the sum of the display data.

22. The organic light-emitting diode (OLED) display device of claim 21, wherein the scan period look-up table is a register storing display scan period values and configured to output the display scan period values substantially proportional to the sum of the display data.

23. The organic light-emitting diode (OLED) display device of claim 21, wherein the scan period look-up table is a register storing display scan period values and configured to output the display scan period values substantially inversely proportional to the sum of the display data.

24. The organic light-emitting diode (OLED) display device of claim 21, wherein the scan period look-up table further receives a reference current coefficient corresponding to the OLED display panel, the scan period look-up table outputting the display scan period control signal to the current sources in response to a product of the sum of the display data and the reference current coefficient.

25. The organic light-emitting diode (OLED) display device of claim 21, wherein the scan period look-up table further receives a specific coefficient corresponding to the OLED display panel, the scan period look-up table outputting the display scan period control signal to the current sources in response to a product of the sum of the display data and the specific coefficient.

26. The organic light-emitting diode (OLED) display device of claim 21, wherein the scan period look-up table further receives a delay coefficient corresponding to the OLED display panel, the scan period look-up table outputting a sum of the display scan period control signal and the delay coefficient to the current sources in response to the sum of the display data.

27. The organic light-emitting diode (OLED) display device of claim 18, wherein the display data are n-bit data indicating $2^n$ levels of brightness, n being a positive integer.

* * * * *